May 14, 1957 R. F. AUMANN 2,792,035
SAW CHAIN
Filed April 19, 1955 3 Sheets-Sheet 1
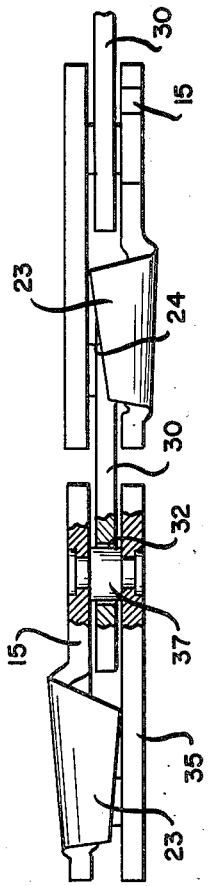
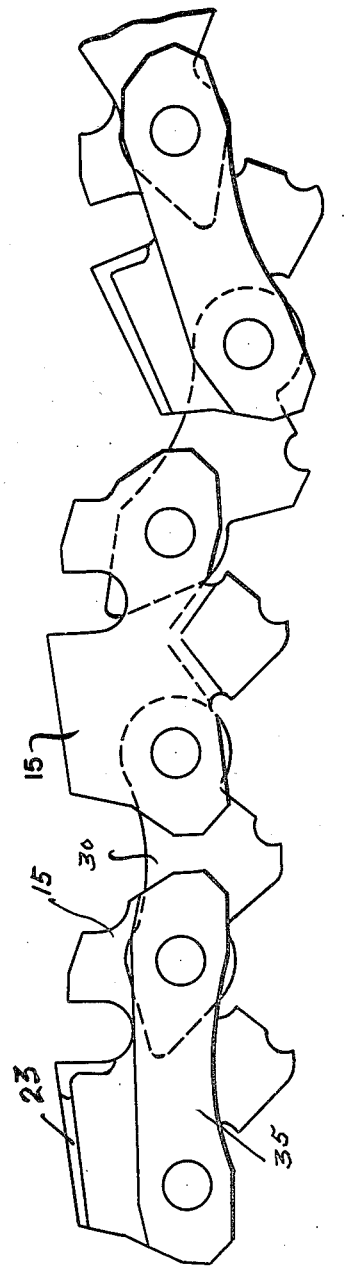
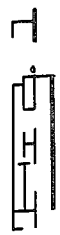
INVENTOR.
RICHARD F. AUMANN
BY
ATTORNEY May 14, 1957 R. F. AUMANN 2,792,035
SAW CHAIN
Filed April 19, 1955 3 Sheets-Sheet 2
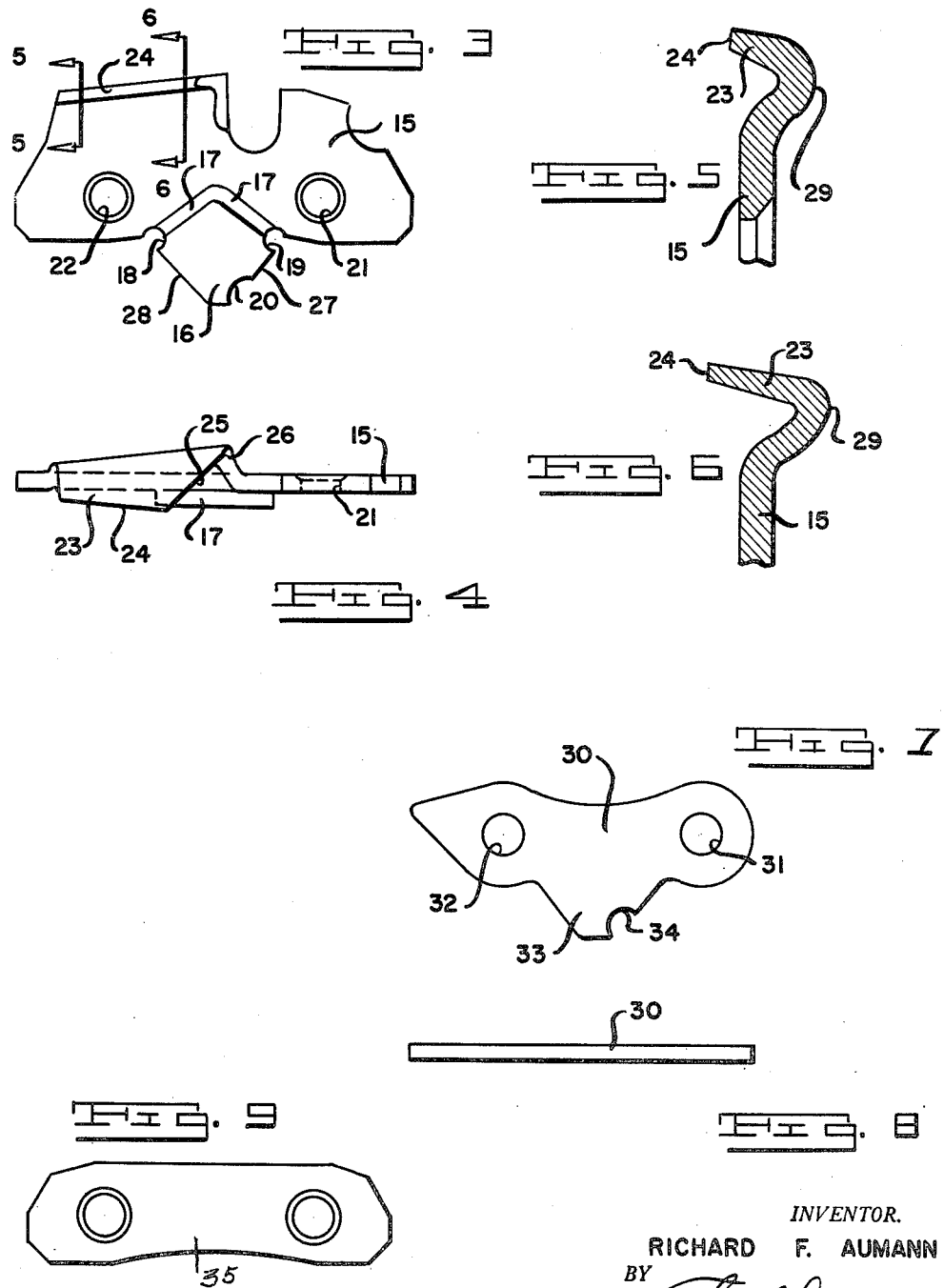
INVENTOR.
RICHARD F. AUMANN
BY
ATTORNEY May 14, 1957 R. F. AUMANN 2,792,035
SAW CHAIN Filed April 19, 1955 3 Sheets-Sheet 3

INVENTOR.
RICHARD F. AUMANN
BY
ATTORNEY

United States Patent Office 2,792,035
Patented May 14, 1957

2,792,035

SAW CHAIN

Richard F. Aumann, Tecumseh, Mich., assignor to Clinton Machine Company, Clinton, Mich., a corporation of Michigan Application April 19, 1955, Serial No. 502,427

1 Claim. (Cl. 143—135)

My invention relates to a new and useful improvement in a chain saw in which an endless chain is provided with a plurality of spaced apart cutters which, in the travel of the chain, effected by a suitable driving power, will cut the material to be sawed. The chain saw referred to is of that type which is used ordinarily for sawing wood. In this type of chain saw the chain is formed from a plurality of links, some of the links embodying a cutting portion, these cutting links being spaced apart by connecting links. It is customary to connect these links at their opposite ends by a rivet pin whereby the links are rigidly connected together and relative lateral play is prevented.

Experience has shown that for the effective operation of a chain saw of this type it is desirable to have a construction in which lateral play of the cutting links may take place under certain conditions which may be encountered, and it is an object of the present invention to provide a structure in which the cutting links may move laterally while the cutting operation proceeds.

It is another object of the present invention to provide a chain saw of this class in which the engagement of the driving member, which is usually a cog, with the links of the chain saw may be such that the driving efficiency is maintained while at the same time a clearance of the gears of the driving member, as they move out of driving position, may be maintained.

It is another object of the present invention to provide a chain saw of this class which will be simple in structure, economical to manufacture, durable, and highly efficient in use.

Another object of the invention is the provision in a chain saw of this class of a cutting link having a sprocket or driving member engaging portion which is laterally offset to the main body of the cutting link.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which,

Fig. 1 is a side elevational view of a chain embodying the invention;

Fig. 2 is a plan view of a chain saw embodying the invention, with parts broken away and parts shown in section;

Fig. 3 is a side elevational view of a cutting link used in the invention;

Fig. 4 is a top plan view of a cutting link used in the invention;

Fig. 5 is a fragmentary sectional view taken on line 5—5 of Fig. 3;

Fig. 6 is a fragmentary sectional view taken on line 6—6 of Fig. 3;

Fig. 7 is a side elevational view of a connecting link used in the invention;

Fig. 8 is a top plan view of the link shown in Fig. 7;

Fig. 9 is a side elevational view of another connecting link used in the invention;

Figures 10, 11:
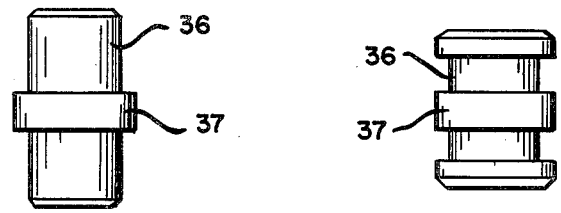
Fig. 10 is a side elevational view of a rivet used in the invention before upsetting.
Fig. 11 is a side elevational view of a rivet used in the invention after the upsetting operation.

As shown in the drawings, the cutting link comprises a body 15 formed from suitable material, having a tongue 16 projecting downwardly from the lower side thereof, the body 15 being laterally offset to provide the trough-shaped beads 17 and 18 at one face of the plate 15.

Formed in this tongue 16 are the circular recesses 18, 19 and 20, the recess 20 being formed in one of the sides 27 which extends angularly to the other side 28 so that a triangular formation is thus determined.

Formed in the body 15 are the openings 21 and 22 which are adapted to receive a rivet.

The body 15 is provided on its upper edge with the angularly turned portion 23 having the edge 24 and the forwardly extending cutting edge 25 and the cutting edge 26. The cutting edge 24 extends on one side of the body 15 a greater distance than does the rear surface 29 of the lateral offset, as shown in Fig. 5 and Fig. 6. As shown in Fig. 5 and Fig. 6, the amount of extension of the cutting edge 24 on the main side of the body 15 decreases due to the slant of the cutting edge 24, as shown in Fig. 4.

Connecting links 30 are provided, having the openings 31 and 32 for reception of the connecting rivets, and provided with a tongue 33 projecting from one side thereof having an arcuate recess 34 formed therein.

As clearly shown in Fig. 2, these connecting links 30 are positioned on the inner side of the plates 15 so as to lie between the plates 15 and the connecting links 35. As shown in Fig. 2, the angularly turned cutting portions 23 on each alternating cutting link are oppositely faced so as to extend across the width of the connecting links 30.

The rivets 36, which are extended through the plates 15, 35 and 30, are each provided with a peripheral shoulder 37 intermediate the ends thereof.

As shown in Fig. 2, the inner face of the plate 15 engages the end face of the shoulder 37, and the opposite face of this shoulder is engaged by the inner face of the plate 35. The opening 32 through the plate 30 is of a size to loosely receive the shoulder 37.

As clearly shown in Fig. 1, there is a space between the inner face of the plate 15 and the opposed face of the connecting link 30, and likewise there is a clearance between the inner face of the connecting link 35 and the opposed face of the link 30. There is also a clearance between the shoulder 37 and the opening 32 of the link 30 so that a lateral play in the chain thus formed is possible. This is an important feature in a chain saw of this class in that, when the chain saw suddenly encounters an increased resistance, lateral play of the cutting link which has encountered this increased resistance may take place. This will result in less frequent breaking of the chain, and effect a prolonged life of the chain.

Figure 12:
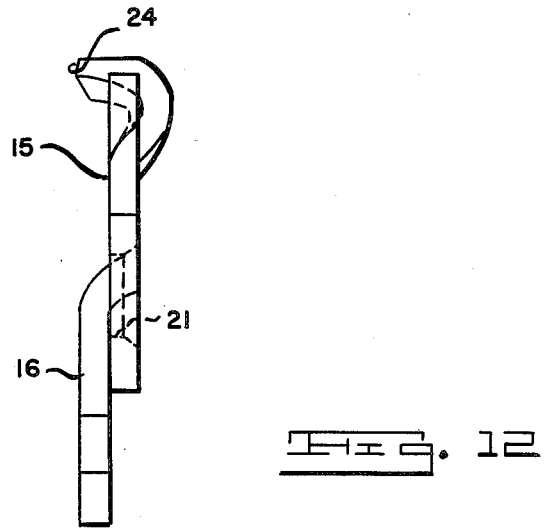
Fig. 12 is an end elevational view of the cutting link used in the invention.

As clearly shown in Fig. 12, the tongue 16 is laterally offset from the main body of the cutting link 15, and this offset is such that, when the chain is assembled, the tongue 16 will be in alignment with the link 30. Thus, the tongue 16 is located centrally of the assembled chain, and it is on this tongue that the driving power is transmitted. Thus, there is a more stable and steady movement of the chain while being driven, and the formation of the reenforcing ribs or beads 17 prevents distortion of this driving tongue when in use.

As shown in Fig. 4, the cutting edge 25 forms a straight line and the cutting edge 26 is partly curved. The portion of the cutting edge which lies on one side of the center of the plate 15 is equal to the portion of the cutting edge which lies on the opposite side. This does not mean that the offset portion 29 extends laterally from one face of the plate 15 the same distance as the edge 24 extends laterally from the opposite side, due to the fact that the edge 26 is curved.

By having an equal portion of cutting edge on opposite sides of the medial line of the plate 15, a balance of stress delivered to the cutting tooth is obtained and a more even operation of the saw is effected.

What I claim is:

In a saw chain, a pair of longitudinally spaced cutting links each having a main body portion, a cutting portion projecting from one edge of said body portion and a sprocket-engaging drive tongue projecting from the opposite edge of said body portion, said body portions of said pair of cutting links being parallel and spaced laterally apart, a connecting link coextensive in length with and opposite each cutting link in spaced parallel relation thereto, the connecting link opposite each cutting link lying in the plane of the body portion of the other cutting link, a connecting element comprising a flat plate lying in the medial plane of the chain and having each of its ends projecting into the space between a cutting link and its connecting link, means pivotally connecting each end of said connecting element to the adjacent cutting and connecting links, said connecting element having a sprocket-engaging drive tongue projecting from one edge thereof and lying in the medial plane of the chain and the drive tongue on each cutting link being parallel to the body portion of said cutting link but offset laterally therefrom to lie substantially in the plane of the drive tongue on said connecting element.

References Cited in the file of this patent

UNITED STATES PATENTS

| 2,508,784 | Cox | May 23, 1950 |
| 2,515,550 | Ciba | July 18, 1950 |
| 2,595,884 | Reid | May 6, 1952 |

FOREIGN PATENTS

| 823,038 | Germany | Nov. 29, 1951 |